Jan. 15, 1957 H. C. FISCHER 2,777,501
APPARATUS FOR CONTINUOUSLY FORMING PLASTIC TUBING
Filed July 30, 1955 11 Sheets-Sheet 1

INVENTOR.
HERBERT C. FISCHER
BY
ATTORNEY

Jan. 15, 1957   H. C. FISCHER   2,777,501
APPARATUS FOR CONTINUOUSLY FORMING PLASTIC TUBING
Filed July 30, 1955   11 Sheets-Sheet 2
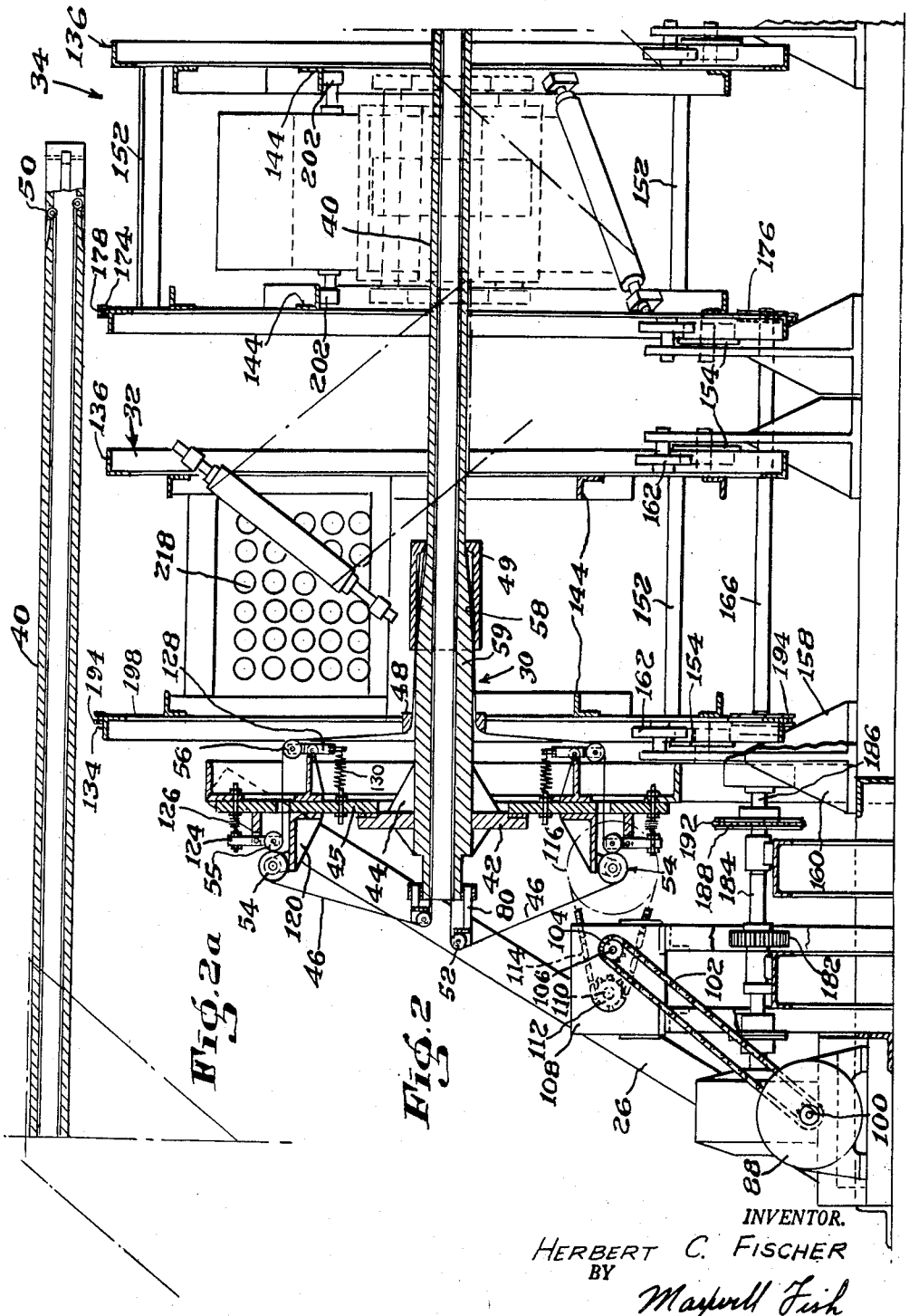
INVENTOR.
HERBERT C. FISCHER
BY
Maxwell Fish
ATTORNEY

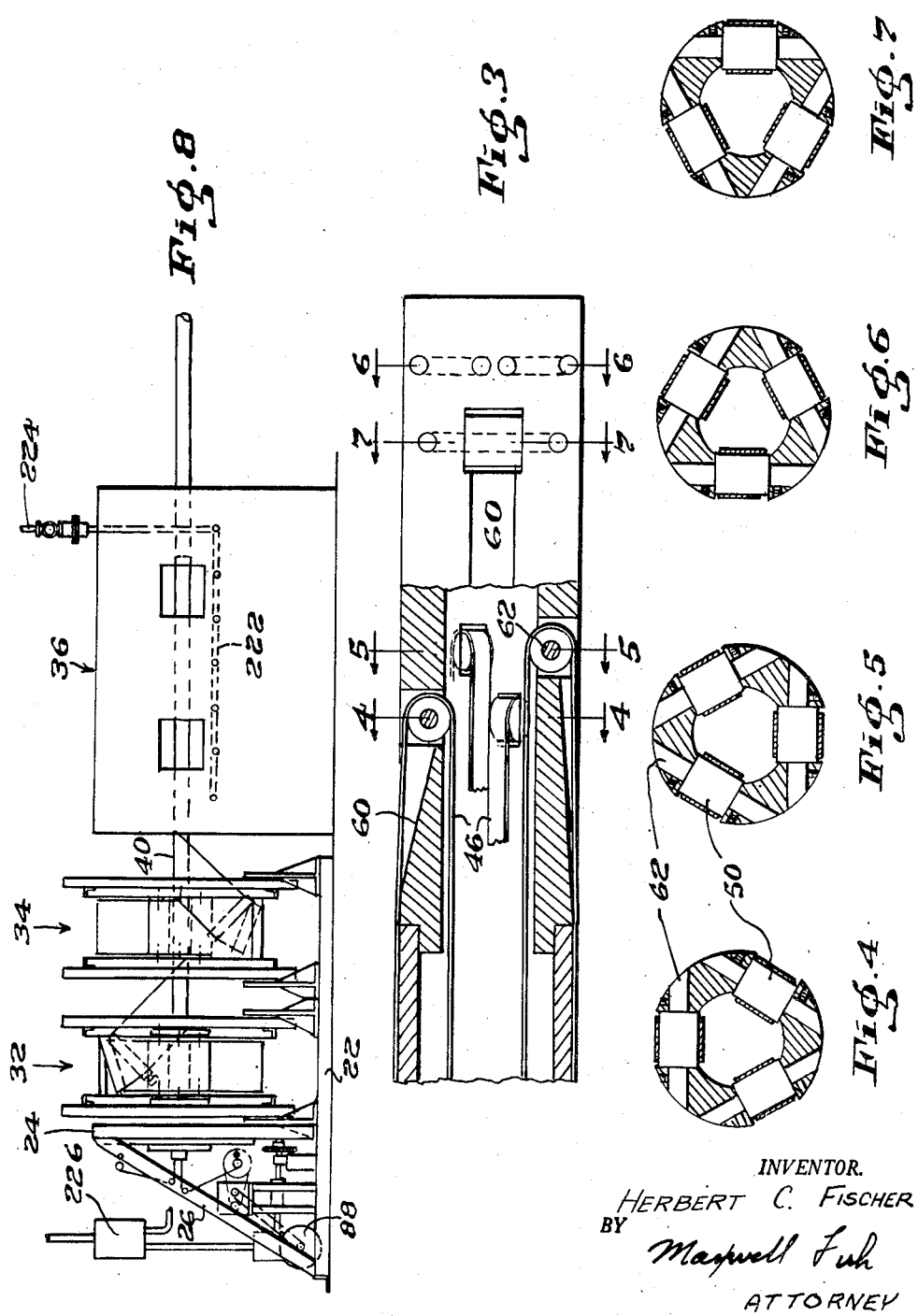

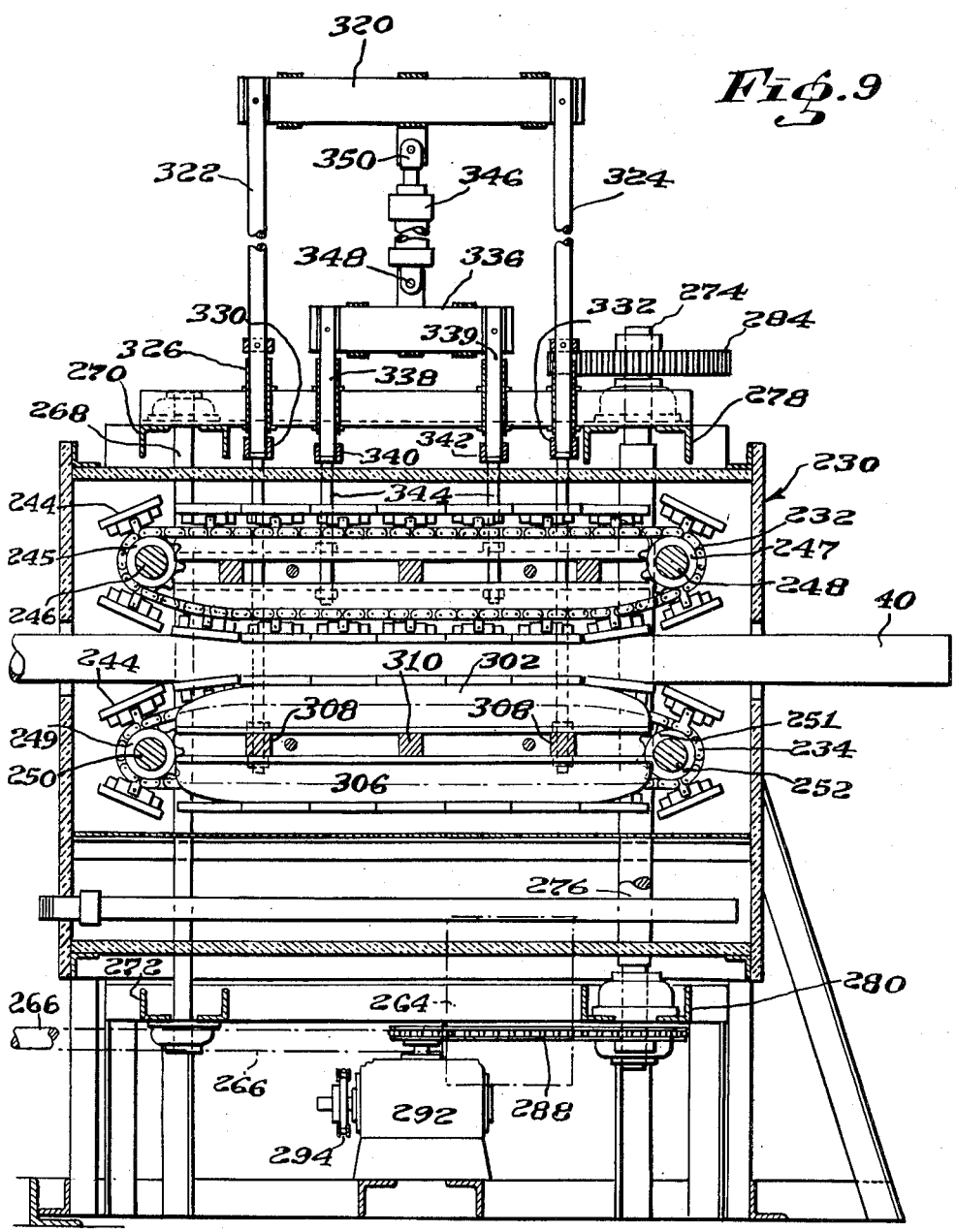

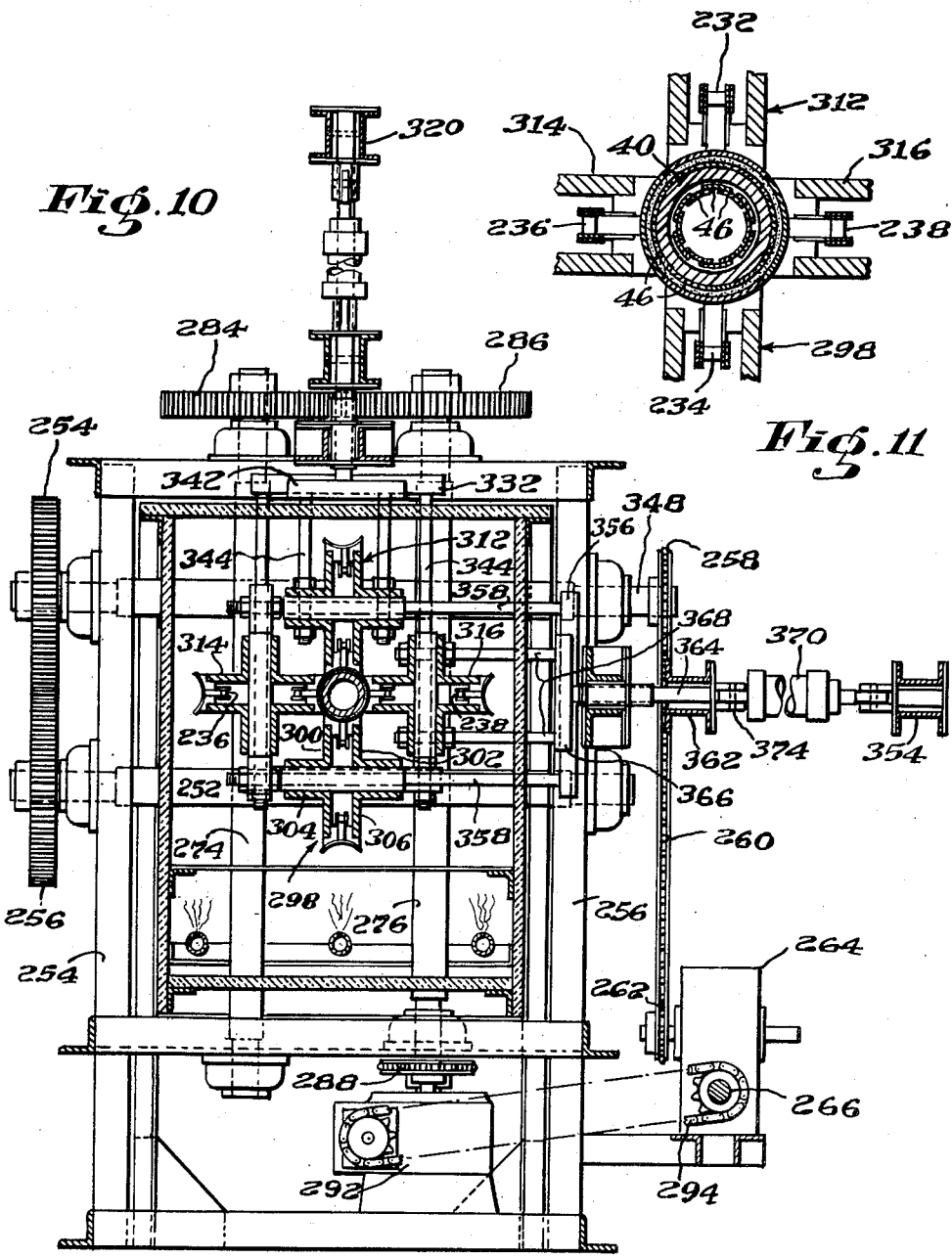

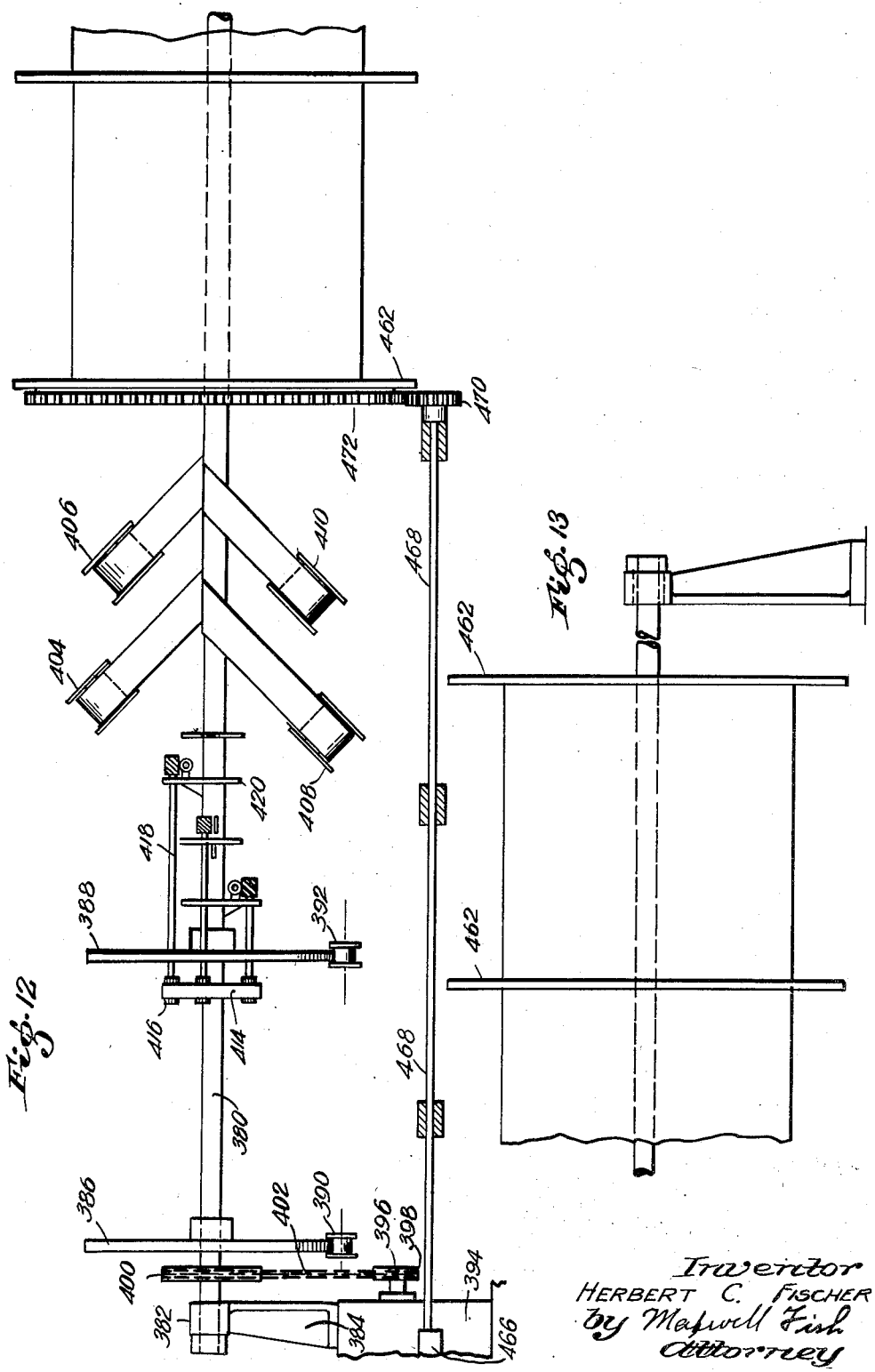

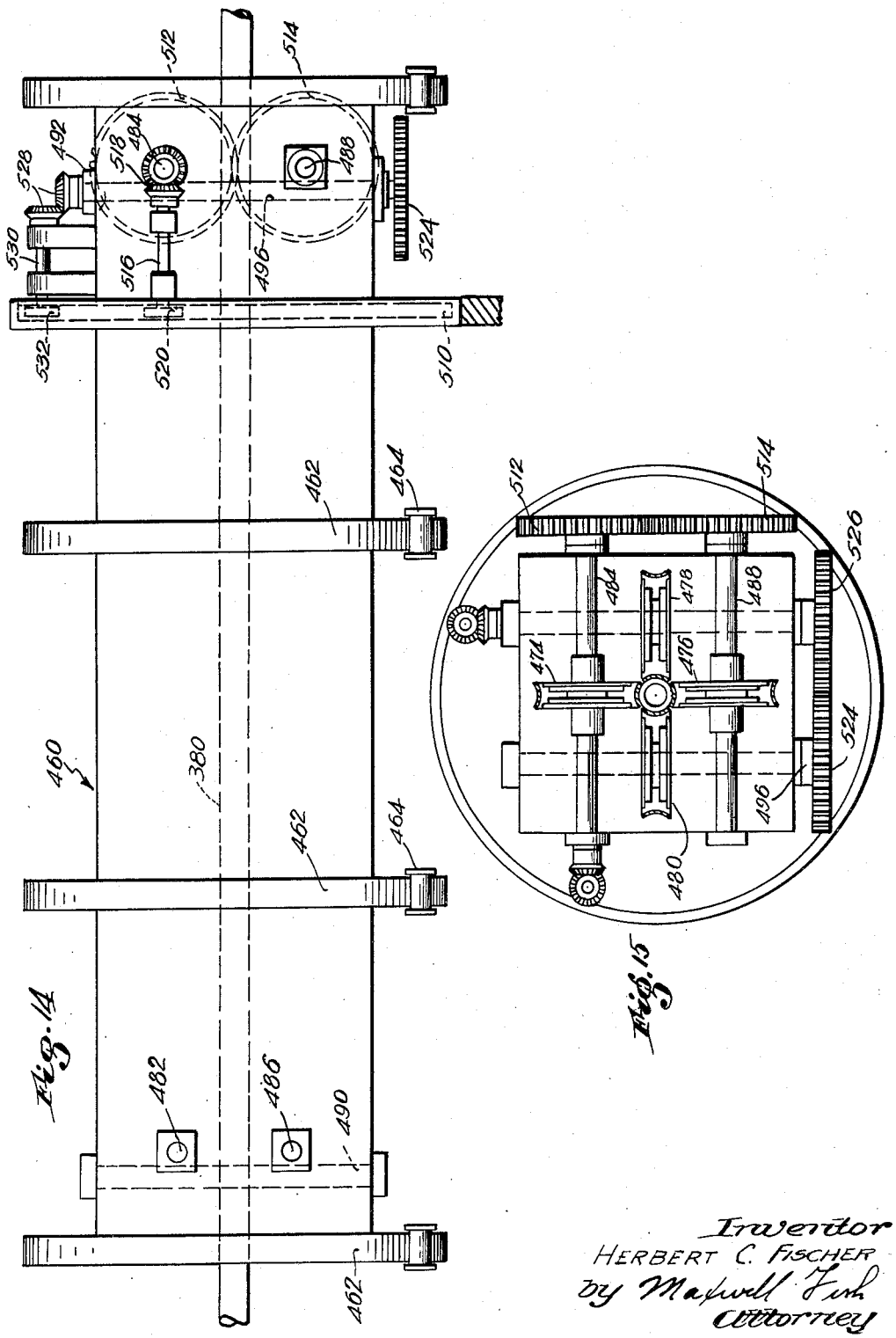

Jan. 15, 1957  H. C. FISCHER  2,777,501
APPARATUS FOR CONTINUOUSLY FORMING PLASTIC TUBING
Filed July 30, 1955  11 Sheets-Sheet 8
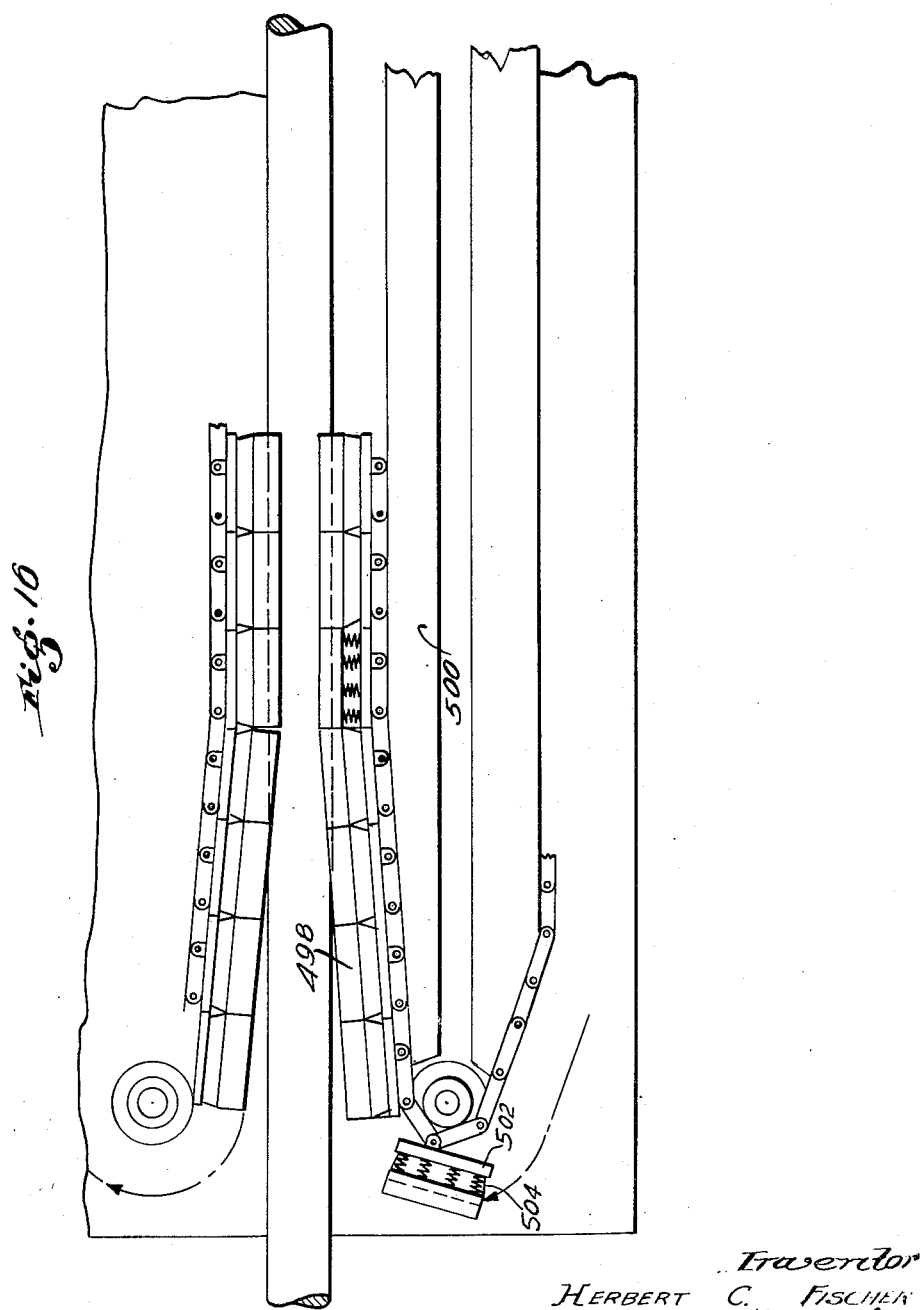

Jan. 15, 1957 H. C. FISCHER 2,777,501
APPARATUS FOR CONTINUOUSLY FORMING PLASTIC TUBING
Filed July 30, 1955 11 Sheets-Sheet 9
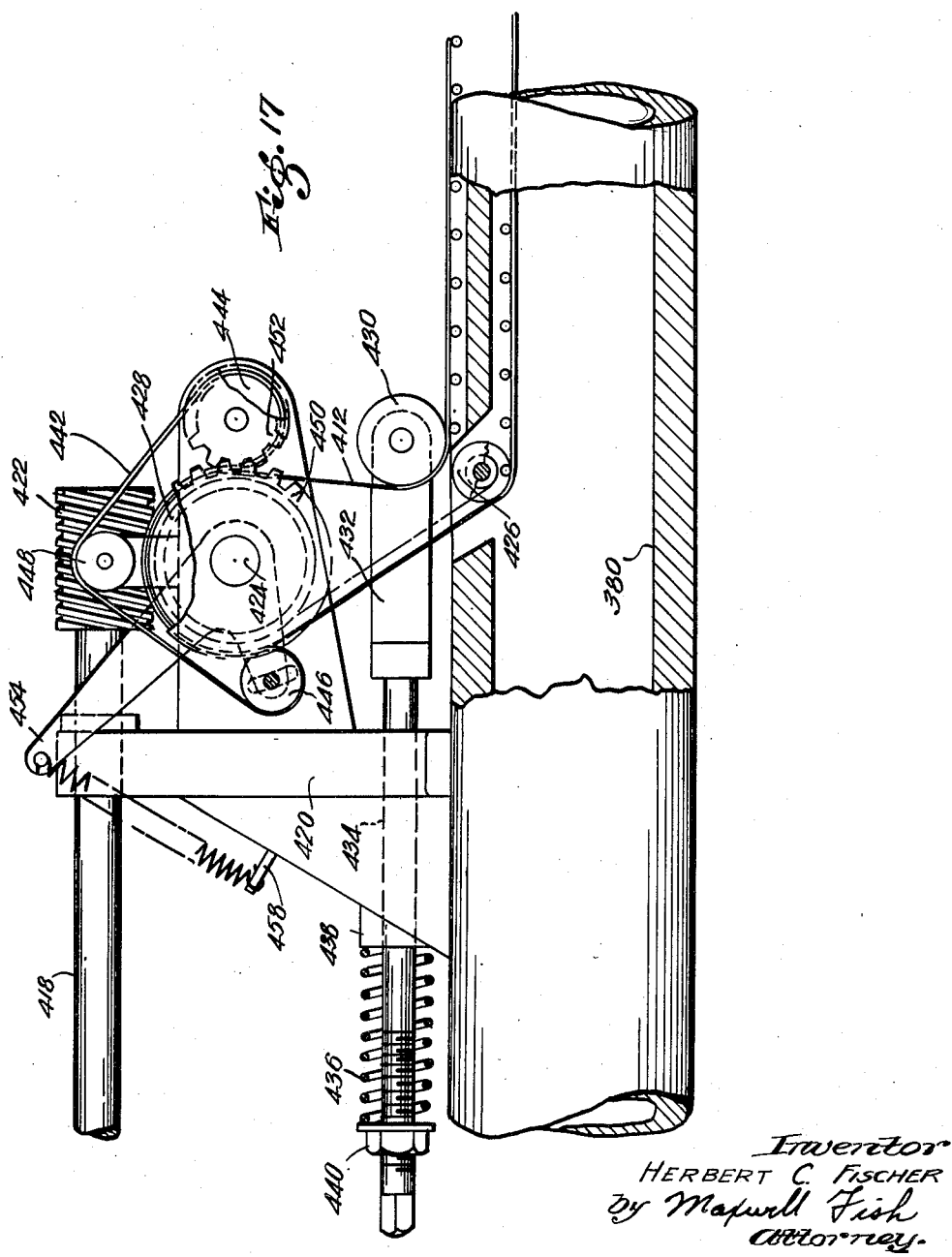
Inventor
HERBERT C. FISCHER
By Maxwell Fish
Attorney.

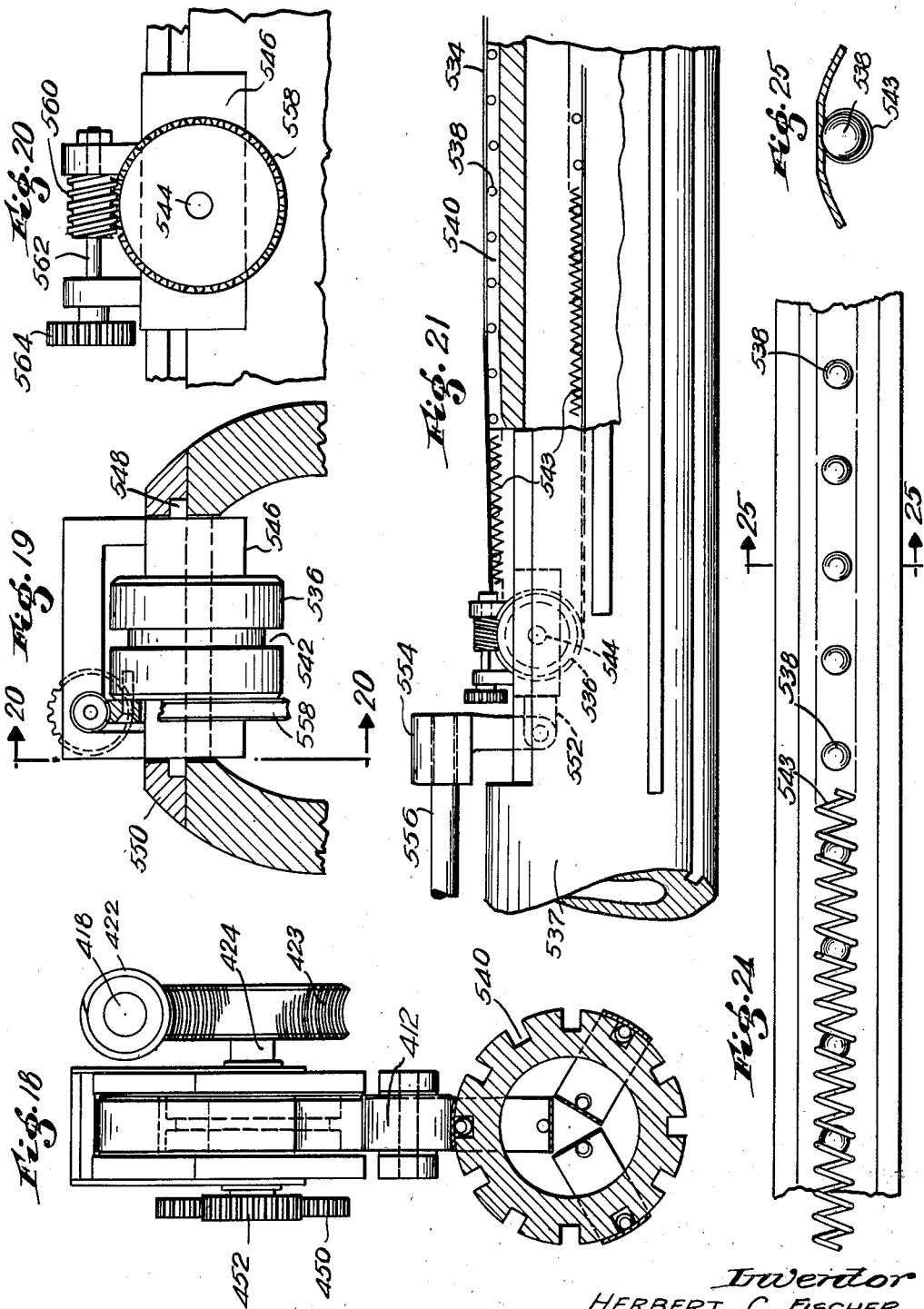

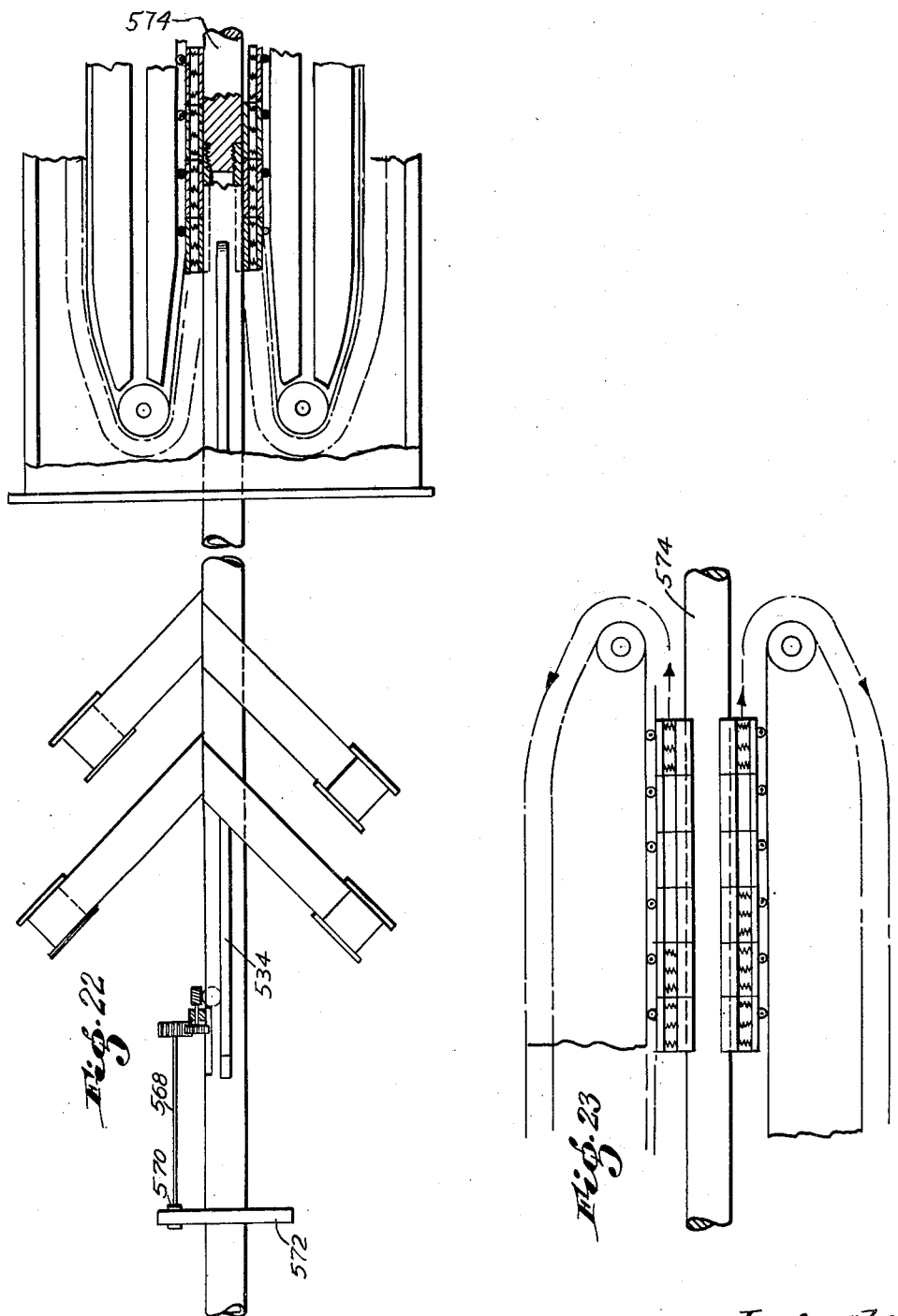

2,777,501

APPARATUS FOR CONTINUOUSLY FORMING PLASTIC TUBING

Herbert C. Fischer, Wellesley Hills, Mass., assignor to National Fibre Glass Co., Inc., West Hanover, Mass., a corporation of Massachusetts Application July 30, 1954, Serial No. 446,899

29 Claims. (Cl. 154—1.8)

The present invention relates to improvements in apparatus for continuously forming a product from plastic material, and is a continuation in part of my co-pending application Serial No. 346,689, filed April 3, 1953, for Manufacture of Tubing From Organic Plastic Material.

While in the preferred form of the invention hereinafter described, a machine is shown which is particularly adapted for the continuous production of tubing of fiber glass strips impregnated with phenol-formaldehyde resin, it will be understood that the invention in its broader aspects contemplates the manufacture of tubing from other materials which may be formed or molded and thereafter hardened by appropriate means. The material may be suitable to be directly applied to a traveling shaping device or mandrel, or may be a strip material including a bonding agent. Certain features of the invention are readily adapted for use in a machine for continuously forming products of different shapes including such shapes which are solid in cross section.

It is a principal object of the invention to provide a novel apparatus for the continuous production of tubing from such materials which is well adapted for supporting and advancing the newly formed product, setting the material in the desired shape, and for discharging the finished product from the machine.

More particularly it is an object of the invention to provide a novel and improved mandrel including a mandrel surface arranged to move with the tubing as it is formed through a substantial distance, and which is thereafter removed from within the finished product.

It is a further object of the invention to provide a novel and improved endless tape, together with the supporting means therefor to form the traveling mandrel surface which is well adapted to meet the exacting demands upon it in the apparatus herein described. In accordance with the invention a steel tape is preferably employed which is well adapted to provide a hard unyielding tube forming surface, and which is at the same time capable of being flexed continuously for indefinite periods without breaking so that the tapes may have long life in actual operation.

It is a further object of the invention to provide a novel and improved means for applying pressure to the shaped material as it is formed with suitable temperature control to provide for a most efficient hardening or curing of the material.

Other objects of the invention are to provide an improved construction and organization of the several operating instrumentalities of the machine providing for the support and advance of the newly formed tubing and the traveling mandrel surface therewith.

With these and other objects in view which may hereinafter appear a feature of the invention consists in the construction and arrangement of a mandrel on which the tubing is formed and set consisting of a tubular core supported from the machine, and a traveling tube supporting surface which is continuously assembled preparatory for the forming of the tubing thereon, is moved with the newly formed tubing along the length of the mandrel, and is thereafter collapsed inwardly and returned through the passageway within the mandrel.

In accordance with the invention the traveling mandrel surface consists of a plurality of endless carriers or tapes which are assembled and grouped in parallel relation along the length of the mandrel to form a substantial cylindrical moving supporting surface. The traveling support is of sufficient length to allow the tubing to obtain an initial set and to become self-supporting before it has moved beyond the outer end of the mandrel support. The endless carriers are further supported at the tip end of the mandrel to turn inwardly and then to follow a return path through the tubular core.

In one form of the invention shown the several carriers, in the form of endless metal strips, are driven at the same linear rate to provide an unyielding solidly formed cylindrical wrapping surface which travels continuously toward the tip end of the mandrel. The resin impregnated fiber glass strips are wound into rolls which are mounted on large cylindrical frames or wrappers which are rotatably mounted co-axially with the mandrel causing the strip or strips to be wound spirally on the external cylindrical surface of the mandrel.

Another feature of the invention consists in the provision of additional devices, supported externally of the mandrel, and newly formed tubing carried thereon for applying and for maintaining a regulated pressure against the tubing while moving along the length of the mandrel during the initial setting stage. Pressure is applied by means of conveyor devices having flights which successively engage and are carried along with the tubing. In the preferred form of the invention shown the conveyor devices are driven at the same linear rate with the endless carriers on which the tubing is formed, and thus perform the important additional function of assisting in the feed of the newly formed tubing along the length of the mandrel.

Specifically in accordance with the invention the traveling mandrel support is formed of endless tapes of stainless steel having longitudinal lines of hardening spaced across the width of the tape. The stainless steel tape treated in this manner is completely resilient with no tendency to set, and with a very substantial retardation of fatigue.

In one form of the invention the tube forming apparatus consists of a relatively fixed mandrel assembly including the mandrel core on which are mounted the endless carrier tapes forming the mandrel surface, above referred to, and in combination therewith reels for plastic impregnated fiber glass strips which are rotated about the axis of the mandrel in timed relation to the advance of the mandrel surface. With this construction and arrangement of the apparatus a continuously formed tubing of any desired length is produced.

In another form of the invention the mandrel assembly including the endless tapes associated therewith is continuously rotated on the mandrel axis with relation to relatively stationary reels from which are supplied the plastic impregnated fiber glass strips. In this form of the invention devices herein described for applying heat and pressure to cure the newly formed tube are caused to rotate co-axially with the mandrel assembly. Whereas, in the preferred form of the apparatus a separate mechanism is provided for driving the endless tapes it has been found that under certain conditions the drive for the endless tapes may be dispensed with and reliance placed principally upon the device for applying heat and pressure to advance the newly formed tubing and the traveling mandrel support on which the tubing is carried. This form of the apparatus has a substantial advantage in that the strains to which the endless tapes are subjected are very substantially decreased and the life of the tapes is correspondingly increased.

Still another feature of the invention consists in a preferred arrangement of the apparatus including the mandrel, the endless tapes forming the traveling tube supporting surface, the means for forming a tubing of plastic impregnated material on the traveling surface, and the devices for applying heat and pressure to the newly formed tubing. In this form of the device the traveling mandrel surface is continued along a portion only of the length of the mandrel to an extent only which is required to bring the tubing substantially within the range of the devices for applying pressure and heat to the tubing. The newly formed tubing having received an initial set from contact with the heated surfaces of the mandrel assembly passes onto a rigidly formed fixed tip portion of the mandrel, and while supported thereon is subjected to a heavy external pressure by the conveyor supported flights of the device for applying heat and pressure to the tubing.

The several features of the invention hereinafter described and claimed, together with the advantages to be obtained thereby will be readily understood by one skilled in the art from the following description taken in connection with the accompanying drawings, in which:

Fig. 2 is a view partly in section looking from the right side of the machine shown in Fig. 1, the mandrel and fiber glass strip supporting wrappers having been sectioned for clarity of illustration;

Fig. 2A is a view looking from the right and in section of the outer end portion of the mandrel of which the inner end portion is shown in Fig. 2;

Fig. 3 is an enlarged detailed view in section of the tip of the mandrel to illustrate particularly the manner in which the endless metal strips forming the cylindrical wrapping surface of the mandrel are withdrawn and fed rearwardly through the mandrel;

Figs. 4, 5, 6 and 7 are sections taken respectively on and correspondingly numbered section lines of Fig. 3;

Fig. 8 is a small scale view of the machine looking from the right including a drying oven adapted for the further curing and setting of the tube during its travel along the mandrel;

Fig. 9 is a vertical section looking from the right side of the machine taken through the heating unit which surrounds the mandrel, and showing a modified form of the invention which includes conveyor devices for applying external pressure to the newly formed tubing during a major of its travel along the length of the mandrel;

Fig. 10 is a view partly in section looking from the left end of Fig. 9;

Fig. 11 is an enlarged detail sectional view taken through the mandrel and clamp conveyors;

Figure 1:
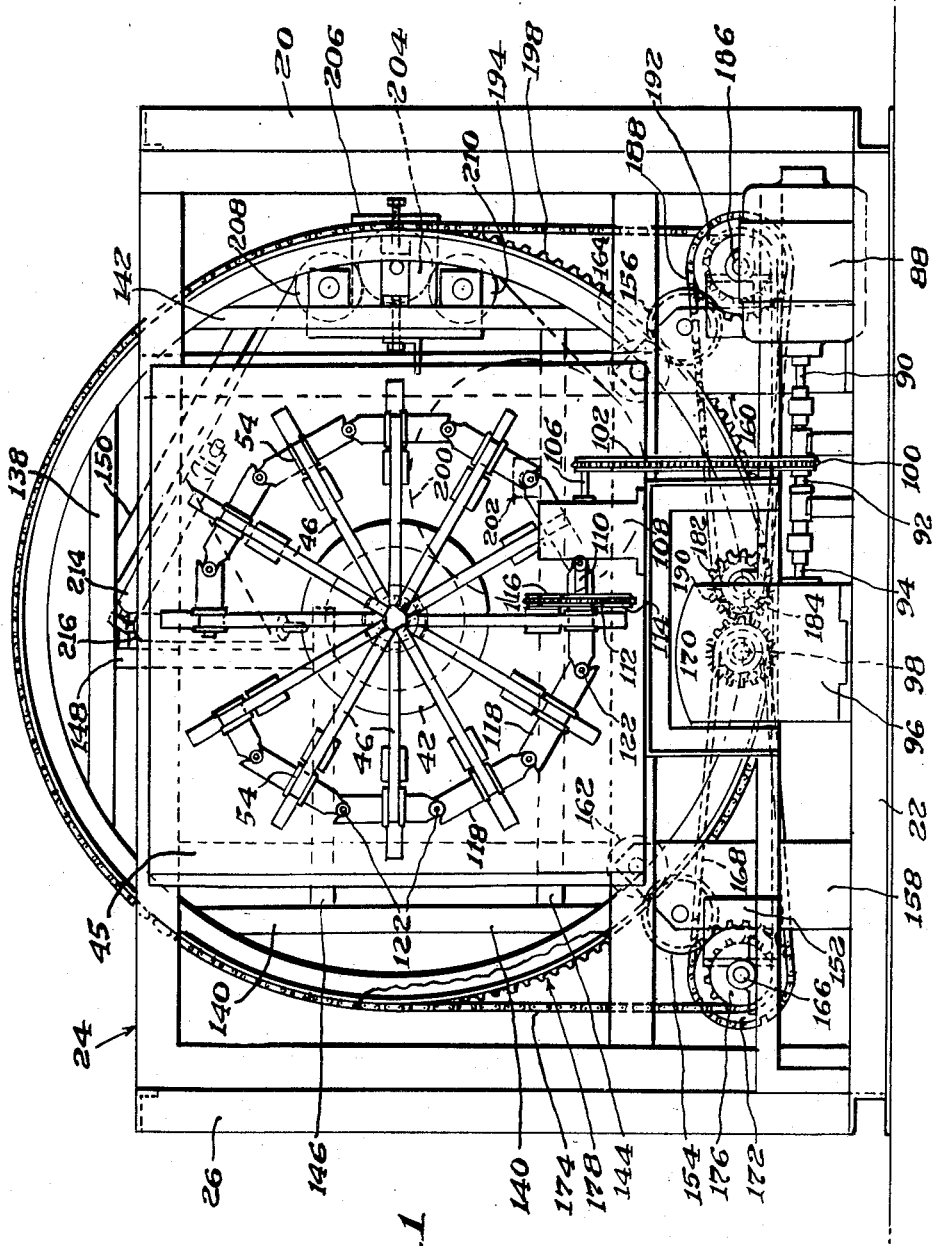
Fig. 1 is an end view of a machine for forming fiber glass tubing embodying in a preferred form several features of the invention.

Figs. 12 to 18, inclusive, illustrate a modified form of the invention in which the mandrel assembly and the pressure applying assembly are rotated within the machine with relation to two or more relatively fixed wrappers from which impregnated fiber glass web is supplied;

Fig. 12 is a somewhat diagrammatic view in side elevation, except that the wrappers are shown 90° out of the way, illustrating particularly the rotational drive for the mandrel and the connections by means of which the several tapes are advanced;

Fig. 13 is a continuation of Fig. 12 showing the tip portion of the mandrel and a portion of the oven through which the newly formed tubing is passed;

Fig. 14 is an enlarged detail view of a modified form of rotating pressure applying unit;

Fig. 15 is an end view of the mechanism shown in Fig. 14 looking from the right;

Fig. 16 is an enlarged detail view of a portion of the pressure applying unit shown in Figs. 14 and 15 including two oppositely disposed endless carrier chains, the associated flights having a yieldable shoe engaging surface, and relatively fixed pressure applying cams.

Fig. 17 is an enlarged detailed view in side elevation showing the drive and take-up devices for one of the several tapes of which the mandrel surface is formed;

Fig. 18 is an end view looking from the right of the mechanism shown in Fig. 17;

Figs. 19 to 21, taken together with Figs. 22 and 23, illustrate an alternative form of the invention in which the driving rollers for the several tapes are mounted in the mandrel so that the tapes may be driven without subjecting the tapes to reverse bending;

Fig. 19 is a fragmentary cross sectional view of a portion of the mandrel showing the tape supporting rolls and driving connections thereto;

Fig. 20 is a sectional view taken on a line 20—20 of Fig. 19;

Fig. 21 is a view in side elevation of a portion of the mandrel showing in further detail the driving connections shown, for example, in Fig. 20;

Figs. 22 and 23 illustrate still another form of the invention in which it is proposed that the pressure applying unit shall act against a relatively stationary tip portion of the mandrel disposed beyond the end of the traveling mandrel surface provided by the several tapes;

Fig. 22 is a somewhat diagrammatic view of the left hand portion of the apparatus;

Fig. 23 is a somewhat diagrammatic view of the right hand portion of the apparatus including the tip portion of the mandrel and the pressure applying unit;

Fig. 24 is an enlarged plan view of a portion of one of the tapes; and

Fig. 25 is a view taken on a line 25—25 of Fig. 24.

The apparatus particularly illustrated in Figs. 1–11, inclusive in accordance with the invention for the manufacture of glass tubing from phenol-formaldehyde impregnated glass fiber strips comprises a frame 20 built up of structural steel parts including a rectangular base frame 22, a rectangular upright frame 24 and a pair of diagonal upwardly extending bracing supports 26.

The principal cooperating elements of the apparatus as shown in Fig. 1 comprise a mandrel designated generally at 30, and formed with a support surface which travels continuously in the direction of feed, two wrappers 32 and 34 mounted co-axially with the mandrel, a heating oven 36 within which the portion of the mandrel extending beyond the wrappers is housed to effect an initial bonding and setting of the newly wound glass tubing, and a baking oven, not specifically illustrated to effect a final curing and hardening of the glass tubing.

The two wrappers 32 and 34 provide support for rolls of impregnated glass fiber in strip form and are constructed and arranged to deliver the strips to the mandrel at a lead angle which produces an overlap of one-half the width of each strip. The two wrappers are positively driven in opposite directions to produce spiral windings of the fiber glass strips in opposite directions on the core.

The mandrel 30, provided in accordance with the invention, comprises a tubular core member 40 which is provided at its left hand or inner end with a transverse supporting flange 42 of cylindrical shape which is formed integrally with the core, and is further rigidly connected thereto by reinforcing corner pieces 44. The flange 42 is in turn secured to a rectangular support plate 45 which is securely bolted to the upright rectangular frame 24. In the illustrated embodiment of the invention it is assumed that the total length of the core member 40 is in the neighborhood of about 12 feet, and the effective length of tubing which will be wound and supported upon the mandrel at one time is approximately 10 feet.

The outside face or surface of the mandrel, onto which the impregnated strips are wound, is formed by a group of 12 endless steel tapes 46 which are grouped about the core member 40 and extend longitudinally thereof to form a rigid cylindrically shaped tube supporting surface which moves continuously along the length of the core 40, taking shape at the left hand or inner end of the mandrel and collapsing inwardly the right hand or outer end of the mandrel to free the partially hardened fiber glass tube therefrom. Each tape 46 is supported toward the left or inner end of the mandrel to pass under a collar 48 and under a collar 49, thence along the length of the core member 40, around a roller 50, and back through the passageway provided along the axis of the tubular core, around an idler roller 52, thence in a generally radial direction outwardly to a driving roller 54, and associated pinch roller 55 over a take-up tensioning roller 56 to the initially referred to guide collar 48.

In the apparatus shown, the external diameter of the mandrel provided by the tapes 46 is assumed to be 4 inches. Each steel tape provided for the particular mandrel illustrated is 1 inch in width, and the individual tapes are separated from one another by 1/64 of an inch.

While in the illustrated form of the invention a group of 12 endless steel tapes have been employed to provide a tubular support for the manufacture of glass tubing having a four inch internal diameter, it will be understood that the invention in its broader aspects contemplates the manufacture of tubes which may be of substantially larger or smaller diameters. Other forms of conveyors may be employed in place of the tapes specifically illustrated including chain conveyors with flights, or wires which would be arranged and supported in substantially the same manner as the steel tapes shown.

In order to insure that the several tapes 46 will be maintained accurately in position with relation to one another to provide a rigidly formed cylindrical tube supporting surface during the travel along the length of the core member, special means are provided for supporting and for guiding each of the several tapes along an exactly predetermined path along the outside of the core member 40. In the form of the invention shown in Figs. 1 to 11, inclusive, at the inner or the left hand end of the mandrel tapes 46 passing under the collar 49 are caused to ride in grooves 58 formed in an enlarged base end portion 59 of the core member 40 so that the tapes are individually accurately positioned at the beginning of their movement along the surface of the mandrel. At the outer or right hand end of the mandrel each tape 46 is directed inwardly at a slight angle toward the axis of the core member into a shallow inwardly sloping groove 60 which is formed in the outer end of the core member, and which terminates in a slot of sufficient size to support a small pulley 50 mounted on a pivot pin 62 and having its external surface sufficiently below the peripheral surface of the bore member so that the associated tape will be bent inwardly into the slot 60 above referred to. The guide surfaces 58 and 60 have been found to maintain the tapes in their correct relative positions with a high degree of accuracy. The slots 60 serve also to maintain the steel tapes accurately in position as they pass around the rollers 50 at the tip end of the mandrel.

For the return movement through the bore of the core member 40, the tapes are nested in overlapping relation. In order to provide sufficient space for the turning inward and reversal of the individual tapes for their return movement the rollers 50 are arranged in four groups of three each, as specifically shown in Figs. 4 to 7, inclusive, the three rollers of each group being equally spaced 120° apart about the periphery of the mandrel. The rollers of the first group shown in Figs. 3 and 4 are so located as to cause the tapes, passing around these rollers, to be withdrawn from engagement with the newly formed glass fiber tube and to start the return movement while the remaining tapes continue their feeding movement. A second group of 3 rollers are spaced 60° about the mandrel axis from the first group and also further toward the nose of the mandrel. The tapes passing over the second group of rollers illustrated in Figs. 3 and 5 are withdrawn from engagement with the fiber glass tubing and are then reversed to start their return movement within the mandrel bore. The third group of three rollers 50, as indicated in Figs. 3 and 7, are spaced angularly from the group of rollers shown in Fig. 5 by an amount of 30° to the left and are located still further toward the nose of the mandrel. The fourth group of rollers as shown in Figs. 3 and 6 are spaced angularly to the left from the second group of rollers in Fig. 5 by 30° to the left, and at a still further distance toward the nose of the mandrel.

With the arrangement of the rollers 50 shown, the tapes are withdrawn and started on their return movement in successive groups of three, which are so chosen as to provide for the efficient nesting of the twelve tapes within the relatively confined hollowed-out interior of the core.

As previously noted the tapes 46 emerging from the rear end of the mandrel bore are supported by and pass around the rollers 52. These rollers are mounted on brackets 80 in groups of three, the rollers of each group being spaced equal distances apart around the periphery of the mandrel. The groups of rollers 52 are spaced lengthwise of the mandrel and angularly with relation to one another to facilitate the unnesting and guiding of the tapes in diverging directions.

The twelve driving rollers 54 and the twelve tapes 46 driven thereby are advanced at the same linear rate to provide a solidly formed continuously advancing cylindrical tube supporting surface by means of driving connections from an electric motor 88 supported on the machine base. The armature shaft 90 of the motor is connected through couplings and an intermediate shaft 92 with the input element 94 of a reduction gear speed box 96. A rearwardly extending output shaft 98, from the gear box 96 is utilized to drive the two wrappers as hereinafter set forth. The drive for the 12 rollers 54 is taken from the shaft 92 on which is mounted a sprocket 100 connected by a sprocket chain 102 with a sprocket 104 on the input shaft 106 of a second reduction gear box 108. An output shaft 110, from the gear box 108, is connected by a sprocket 112 and sprocket chain 114 with a driven sprocket 116 supported to turn with the driving rollers 54. As best shown in Figs. 1 and 2, the several driving rollers 54 are formed on individual shafts 118 which are arranged in a circular relation, each being mounted on a bracket 120 (see Fig. 2) on the supporting plate 45, and connected with its adjacent roller shafts 118 by universal joints 122. Approximately half of the roller shafts 118 are connected end-to-end to one side of the driving roller shaft 118 which carries sprocket 116 and the remaining roller shafts 118 are similarly connected end-to-end with the other end of the driving shaft 118. With this construction and arrangement of the individual rollers 54, it will be seen that they are simultaneously driven at the same linear rate through the driving connections from the motor terminating in the sprocket 116.

In order to maintain a driving contact without slippage between each of the driving rollers 54 and associated endless tapes 46 one or more pinch rolls, such as that indicated at 55 are carried on pivoted arms 124 and are maintained yieldably in contact with the roller 54 by means of a tension spring 126. Slack is removed from each tape 46 by means of the associated take-up roller 56 which is supported on take-up roller arm 128 and is held against the tape 46 under tension by means of a tension spring 130.

Each wrapper comprises a pair of ring frames 134, 136 which are formed from angle irons bent into a circular shape and are supported in parallel relation to give the wrapper a generally cylindrical outline. Each ring frame has mounted therein a number of bracing and supporting members such as those indicated at 138, 140, 142, 144, 146, 148 and 150 (see Fig. 1), and suitable cross pieces 152 (see Fig. 2) connecting the two ring frames 134, 136 rigidly together. The two wrappers are externally supported to turn about an axis which coincides with the center line of the relatively stationary mandrel 40. Each ring frame 134, 136 is supported on two outside rollers 154, 156 mounted on supporting brackets 158, 160 on the machine base and arranged to engage the laterally extended flange portion of the respective ring frame. There is also mounted on the respective brackets 158, 160, cooperating rollers 162, 164 which engage against the inner surface of the flange on the ring frame.

The two wrappers 32 and 34 are driven from the machine motor 88 through the reduction gear box 96, above referred to, at a rate which has a definite relation to the linear feed rate to the several steel tapes 46 comprising the external tube supporting surface of the mandrel. As best shown in Figs. 1 and 2 the connection for driving the wrapper 34 comprises a countershaft 166 which extends along the rear side of the machine and is connected to be driven from the drive shaft 98 by means of a sprocket chain 168, a sprocket 170 on the shaft 98 and a sprocket 172 on the countershaft 166. The countershaft 166 is connected to drive the wrapper 34 by means of a sprocket chain 174 which passes around a sprocket 176 on the countershaft 166 and around a large sprocket 178 formed on the outwardly extending edge of ring frame 134 of the wrapper 34.

The left hand wrapper 32, as viewed in Fig. 2, is driven from the drive shaft 98 in the opposite direction from the wrapper 34 through connections which include a spur gear 180 on the drive shaft 98, a spur gear 182 meshing therewith on a parallel jack shaft 184, and a countershaft 186 located at the front side of the machine. As best shown in Fig. 1, a countershaft 186 is driven from jack shaft 184 by means of a sprocket chain 188 which rides around a sprocket 190 on the jack shaft 184 and around a sprocket 192 on a counter-shaft 186. The wrapper 32 is driven from countershaft 186 by means of a sprocket chain 194 which passes around a sprocket 196 on countershaft 186 and around a large sprocket 198 (see Fig. 1) formed on the outwardly extending flange portion of ring frame 134 of the wrapper 32.

As best shown in Figs. 1 and 2 the wrapper 32 provides support for a supply roll of resin impregnated fiber glass material indicated in dotted lines at 200 in Fig. 1. The roll is being supported to turn freely on bearing blocks 202 carried on the supporting members 144 mounted on each of the ring frames 134, 136. Inasmuch as all of the parts of the two wrappers 32 and 34 are identical except that they are of opposite hand, for clarity of description identical parts forming the same functions in the two wrappers are given the same reference characters. It will be understood that the resin impregnated fiber glass material contained in the supply roll 200 has been processed preferably to the so-called B-stage by baking to remove the more volatile solvents from the resin. The material is drawn in the form of a web from the supply roll 200 through a friction roll braking device which comprises a braking roll 204 slidably supported within bearing blocks 206 on the support members 142 on each of the ring frames 134, 136, and two associated nip rollers 208, 210 fixedly mounted on bearing blocks on the support members 142 at each side of the braking roller 204. A frictional resistance to turning may be imposed on the braking roller 204 by a conventional strap-and-drum type frictional brake, not specifically shown. The web of resin impregnated fiber glass material, after passing through the friction braking unit above described, is passed around suitable guide rollers which may include rollers 214 and 126 so that the web is turned and guided from the wrapper at a right angle for wrapping onto the traveling mandrel surface. In the illustrated machine the relative rate of drive, the angle of delivery of the web to the mandrel, the driving rate of each wrapper and the rate of feed of the mandrel surface forming tapes 46, are adjusted to produce an overlap of one-half the width of the material during the winding operation. During the passage of the resin impregnated fiber glass web from the supply roll 200 to the point of discharge from the wrapper, the web is subjected to heat, as for example, by means of two or more electric batteries of lamps as that indicated at 218 in Fig. 2 which tend to soften and to render the material more pliable and to condition the resin for the following winding and fusing operations about to take place.

As best shown in the general view of the machine (Fig. 8), the mandrel 40 passes through a drying oven 36 having gas burners 222 and a gas supply connection 224 by means of which the newly formed tubing is subjected to sufficient heat to produce a rapid setting and hardening of the resin. A temperature of about 350° F. to 750° F., depending on the length of dwell in the heat zone, has been found most effective for this purpose. An electrical outlet which may be of ordinary description is indicated at 226 (see Fig. 8) for supplying power to the motor 88 and the battery of heating lamps 218 in the wrappers 32 and 34.

In the modified form of the invention shown in Figs. 9–11 means are provided for applying external pressure to the newly formed tubing during its travel along the length of the mandrel 40 and while it is being subjected to heat to effect the initial setting of the newly formed tubing. In this form of the device the initial setting is effected by a combination of heat and pressure which is readily adjustable to attain any desired characteristics of strength and toughness in the finished product. The application of external pressure, in accordance with the disclosure of Figs. 9–11, has been found to produce a much tougher, harder product than that produced without the use of the external pressure. As shown in Figs. 9 and 10 the mandrel passes through a dryer 230 which has mounted therein a series of four chain type conveyors including a top conveyor 232, a bottom conveyor 234, and two side conveyors indicated respectively at 236 and 238 in Figs. 10 and 11.

The several conveyor units are similar in construction, each comprising a chain supported at each end of its travel on a sprocket and provided along its length with flights 244 having curved tube engaging surfaces, each of which is arcuate in shape to extend approximately one-quarter of the peripheral distance about the mandrel. The several supporting sprockets are mounted on supporting shafts which extend across the width and height of the dryer and are supported to turn in bearings to be carried externally thereof. The flights 244, during their travel with their conveyor chains are guided and are moved under pressure against the tubing and supporting mandrel during the travel with the moving mandrel surface in the direction of feed by means of guideways or tracks which engage with and control the positions of the flights during their travel in their lengthwise direction, and which are adjustable toward and away from the mandrel to cause the flights to be moved against the mandrel and tubing formed thereon with any desired degree of pressure.

Referring more specifically to the drawing, the chain carrier 232 passes around a sprocket 245 carried on an idler shaft 246 and around a sprocket 247 carried on a power driven shaft 248. The chain carrier 234 is similarly supported at its left hand end on a sprocket 249 carried on an idler shaft 250, and at its right hand on a sprocket 251 carried on a drive shaft 252. Each of these shafts are supported externally of the dryer in bearings formed in frame uprights 254, 256. As best shown in Fig. 10 the drive shafts 248, 252 are connected to rotate in opposite directions by meshing the spur gears 254, 256 at the rear side of the machine. At its forward end drive shaft 248 carries a sprocket 258 which is connected by a chain 260 with a sprocket on output shaft 262 of a reduction gear unit 264. This unit as indicated in dot and dash lines in Fig. 9 is provided with an input shaft 266 which is coupled to the shaft 186 by means of which the first wrapper unit 32 is driven.

The conveyors 236, 238 are supported at their horizontally disposed left hand ends, as viewed in Fig. 9, on sprockets carried by two parallel vertically disposed idler shafts 268 (see Fig. 9), carried in bearings formed in frame members 270, 272 externally of the dryer 230. At their right hand ends as viewed in Fig. 9, and as shown in Fig. 10 the horizontally disposed conveyors 236, 238 are carried on sprockets mounted on two parallel vertical drive shafts 274, 276 mounted at their upper ends in bearings on frame members 278 and at their lower ends in bearings carried on frame members 280, externally of the dryer 230. The drive shafts 274, 276 are connected to turn in opposite directions by means of meshing gears 284, 286 carried on the upper ends of the shafts. At its lower end shaft 276 is connected by means of sprockets and a sprocket chain 288 with the output shaft of a gear reduction unit 292, which is in turn connected by means of sprockets and a sprocket chain 294 with the input shaft 266 of the gear reduction unit 264.

Substantially similar cam tracks or guideways are provided for guiding the flights 244 associated with each of the chain conveyors against the mandrel and tubing carried thereon. As shown in Figs. 9 and 10 the chain conveyor 234 is provided with a cam track 298 which takes the form of four angle irons including two complementary upper angle irons 300, 302, and two complementary lower angle irons 304 and 306 which are supported in fixed spaced relation to the upper angle irons by means of two cross bars 308 and an intermediate spacer member 310. The two upper irons 300 and 302 and also the two lower irons 304 and 306 are separated from one another to receive the chain conveyor 234. The top and bottom edges of the several angle irons form cam surfaces which engage with and support the flights 244 during movement in each direction lengthwise of the mandrel 40. The upper chain conveyor 232, and also the two side chain conveyors 236, 238 are each provided with cam tracks which are identical in construction with the cam track 298 above described for supporting and guiding the associated flights 244 and are indicated at 312, 314 and 316, respectively.

The cam track 298 associated with the lower chain conveyor 234, and the track 312 associated with the upper chain conveyor 232, are moved simultaneously and in opposite directions to engage the flights 244, guided thereby under a substantial pressure against the respective upper and lower sides of the mandrel and newly wound tube, supported thereon by means of a hydraulically operated pressure device which acts in opposite directions against the two cam tracks 298 and 312 and thereby causes a balanced pressure to be exerted against the top and bottom sides of the mandrel. The pressure exerting device referred to comprises a beam 320 which is supported above the machine in parallel relation to the mandrel and has connected to the two ends thereof downwardly extending links 322, 324 which are slidably supported in sleeve guides 326 in the frame member 270, and are connected at their lower ends respectively to cross yokes 330, 332. Links 334 suspended from each end of each cross yoke 330, 332 are connected at their lower ends with the ends of the cross bars 309 to support and draw the lower cam track 298 and flights 244 engaged thereby upwardly against the mandrel. A second beam 336 supported above the machine but below the beam 330 and in parallel relation thereto is provided at its ends with downwardly extending links 338, 339 having mounted at their lower ends cross yokes 340, 342. Links 342 extending downwardly from the two ends of each yoke 340, 342 are connected at their lower ends to the cam track 312 to support and to force the cam track 312 and flight 244 supported thereby downwardly against the mandrel. The two beams 320 and 336 are moved away from one another by means of a hydraulic cylinder 346 which is pivotally connected at 348 to the lower beam 336, and is provided with a piston rod 350 which is similarly connected to the upper beam 320. It will be appreciated that as fluid under pressure obtained from any convenient source is supplied to the cylinder 346 to separate the beams 320 and 336 the lower cam track 298 will be drawn upwardly while at the same time the upper cam track 312 is drawn downwardly to engage the flights supported thereby respectively at the desired pressure against the lower and upper sides of the tubing on the mandrel.

The cam track 314 associated with the left or rear side chain conveyor 236, and the cam track 316 associated with the right hand or near side chain conveyor 238, are arranged to be moved simultaneously and in opposite directions to engage the flights 244, guided thereby, under a substantial pressure against opposite sides of the newly wound tubing on the mandrel by means of a hydraulically operated pressure exerting device which is substantially identical with that previously described for controlling the vertically acting cam tracks 312 and 298. The pressure exerting device, as best shown in Fig. 10, comprises a beam 354 which at its opposite ends is connected by means of links, not specifically shown, with two cross yokes, one of which is indicated at 356. The cross yokes 356 are in turn connected by means of links 358 with cross bars 360 which form a part of the cam track 314 assembly. A second beam 362 supported externally of the oven in parallel relation to the beam 354 is connected at its opposite ends by two links, one of which is indicated at 364 with two cross yokes 366. The ends of the cross yokes 366 are connected by four horizontal links 368 with the cam track 316. The two beams 354, 362 are moved away from one another by means of a hydraulic cylinder 370 pivotally connected at 372 to the beam 362. A piston rod 374 for the cylinder is pivotally connected at 376 to the beam 354. Fluid under pressure supplied from any convenient source to the cylinder 370 will cause the two beams 362, 354 to be relatively separated thus forcing the right hand cam track 316 and the flights 244 engaged thereby to the left, while at the same time the cam track 314 and flights 244 engaged thereby are forced to the right to exert a molding pressure against the newly formed tubing on the mandrel.

The positively driven pressure unit above described supplies most of the power required to feed the newly formed tubing and to advance the traveling mandrel surface provided by the tapes 46, with the result that the life of the tapes is substantially extended. The apparatus has been found to operate in a satisfactory manner when the drive for the tapes is disconnected, and the tapes are free to move with the pressure unit and tubing along the length of the mandrel.

While in the preferred form of the invention shown the pressure applying unit is combined with a mandrel having a traveling mandrel surface adapted for the continuous manufacture of tubing, it will be understood that these elements may be combined for the production of a product having a different shape in cross section, as for example where the traveling surface is a platform, and the flights are shaped to continuously form a product having a solid cross sectional area thereon.

The method disclosed in accordance with the invention of continuously forming tubing of organic plastic material, and more particularly forming tubing from thermosetting resin impregnated fiber glass strip material, comprises the steps of continuously forming a rigidly shaped mandrel conveyor surface, advancing the conveyor surface through a substantial distance, spirally winding organic plastic strip material in over-lapping relation onto the advancing mandrel surface, applying a solidifying medium to harden the wound tubing, and thereafter when the tubing has been hardened to a point where it is self-supporting, collapsing the traveling mandrel surface inwardly. In this manner it will be appreciated that the tubing is supported in a relatively stationary position on a rigidly formed support during the initial hardening operation, and the support is thereafter withdrawn inwardly so that a continuous tube is produced, which is accurately formed and which is unencumbered by a core or other superfluous structural elements.

It is preferred to employ fiber glass strips impregnated with suitable thermosetting resin which may be a phenol-formaldehyde resin such as Bakelite. The resin impregnated material is supplied in strip form wound on rolls suitable for use in the wrappers 32, 34 of the machine having been previously conditioned for use by heating or baking to the so-called B-stage in which the volatile solvents have been removed. During the strip feeding and wrapping operations the phenol-formaldehyde resin impregnated strip is subject to heat to make the material soft and pliable.

The tubing as it is formed by the wrapping operation is carried slowly along the length of the traveling mandrel while at the same time it is baked to further cure and to set the phenol-formaldehyde resin impregnated material in its tubular form. The tubing when discharged from the traveling mandrel is preferably subjected to further drying and curing in an oven, not specifically shown, and may be cut into lengths as may be desired for subsequent use.

In the modified form of the invention shown in Figs. 9–11 the newly wound tubing is subjected to external pressure which has the effect of further hardening the resin impregnated material.

It will be understood that other organic plastic materials well known in the art may be employed in accordance with the invention, as for example polyester resins which are thermosetting, or other materials may be employed, of which cement may be taken as an example, in which pressure and suitable temperatures may be utilized to harden the product during its travel along the conveyor surface of the mandrel.

A modification of the invention is shown in Figs. 12–18 in which the mandrel is mounted in the machine to be rotated with relation to relatively stationary wrappers. In this form of the device, mechanism is provided which rotates with the mandrel for synchronously driving the several mandrel surface forming tapes, and for rotating the pressure and heat applying unit of the machine.

Referring particularly to Figs. 12 and 13, a supporting mandrel 380 is provided which is rotatably supported at its rear end in a bearing 382 formed in a frame member 384 of the machine. The mandrel is further supported by means of two mandrel rolls or disks 386 and 388 which are secured to the mandrel and which are supported adjacent the floor level of the machine on supporting pairs of rollers 390 and 392 which function in the same manner as the rolls 154 and 156, above described. The mandrel is driven from a motor, not shown, through a reduction gear box 394 having an output shaft 396 which is connected with the mandrel 380 by sprockets 398 and 400 and a sprocket chain 402.

In Fig. 12 there are shown four wrappers 404, 406, 408, and 410 from which the impregnated fiber glass strips are fed onto the mandrel supporting surface in the manner above described. In this embodiment of the invention each of the 12 individual tapes, of which one is indicated at 412 in Figs. 17 and 18, are driven synchronously through connections which include a stationary internal ring gear 414 shown in Fig. 12. The drive for each tape is taken from the stationary ring gear 414 by means of a small spur gear 416 and driving shaft 418 of which one will be specifically described in connection with Figs. 17 and 18. As more particularly shown in Fig. 12, a spur gear 416 meshing with the ring gear 414 is mounted on a drive shaft 418 supported to turn on a bearing in the mandrel roll 388, and in a bracket 420 secured to the mandrel 380. At its forward end the drive shaft 418 is provided with a worm 422 which meshes with a worm gear 423 on a cross shaft 424 carried on the bracket 420. The tape 412 emerging from the return passage in the mandrel 380, passes around a guide roller 426, and thence around a feed roller 428, and thence around a second take-up guide roller 430. The take-up roller 430 is carried by means of a yoke 432 on a spring loaded plunger 434 which is spring pressed in a rearward direction by means of a coil spring 436 interposed between an abutment 438 on the bracket 420, and an adjustable nut 440 on the outer end of the plunger. In order to prevent slippage, a friction driving tape 442 is provided which passes around a portion of the driving roller 428 overlying the tape 412, and is further supported on a driving roll 444, and two idler rollers 446 and 448. The driving roll 444 is driven from the shaft 424 by two intermeshing gears 450 and 452 mounted respectively on the shaft 424 and on the pivot for the driving roll 444. In order to tension the driving tape 442, idler roller 446 is separately mounted on a tensioning arm 454, an upward extension of which is connected by tension spring 456 with a fixed pin 458 on the bracket 420.

As best shown in Figs. 14 and 15 a pressure unit is provided with the modified form of the invention which is constructed and arranged to be rotated with the mandrel 380, and the traveling mandrel surface provided by the tapes 412. The pressure unit in this form of the device comprises a casing 460 mounted on a series of large rollers 462 which are in turn supported on pairs of carrying rollers 464 carried on a base portion of the machine. The pressure unit casing 460 is rotated in synchronism with the mandrel 380 through connections which include a power take-off shaft 466 from the reduction gear box 394, a driving shaft 468 coupled to the take-off shaft 466 and extending along the base portion of the machine, and a spur gear 470 on the shaft 468 which meshes with an external gear 472 formed integrally with one of the supporting disks 462 for the pressure unit 460. The pressure unit itself is in many respects similar to that previously described in connection with Figs. 1–11, comprising a series of four chain type carriers including two opposed chain carriers 474, 476 and two similarly opposed chain carriers 478 and 480 set at right angles to the first pair within the unit 460. As best shown in Figs. 14 and 15, the chain carrier 474 is supported at each end of its travel on sprockets carried respectively on cross shafts 482 and 484, and the chain carrier 476 is similarly mounted to travel on sprockets carried on cross shafts 486 and 488. The chain carrier 478 is supported at each end of its travel in sprockets carried on vertically disposed shafts 490 and 492. The chain carrier 480 is similarly mounted on sprockets carried on two shafts including shaft 496 as best indicated in Fig. 15. Each of the chain carriers has mounted thereon flights 498 (see Fig. 16).

During the travel of the respective flights in the direction of feed each flight is guided and supported against the newly formed tubing by engagement with a shoe or cam 500. In this form of the device shown in Figs. 14–16, the shoes 500 are rigidly mounted in the pressure applying unit and each of the flights is formed with a yieldable shoe engaging cushion member adapted to cushion the pressure applied against the tubing and the mandrel. With this construction each flight is permitted to move individually against the surface of the tubing under a constantly maintained pressure so that the outside diameter of the tubing is gradually decreased and the density of the laminates is correspondingly increased as the flight continues its travel toward the tip of the mandrel. As generally shown in these figures a cushion member 502 is mounted on the upper side of each flight and is spaced therefrom by means of coil springs 504. The cushion member 502 is constructed and arranged to extend across the entire width of the flight and is provided with contact surfaces for engagement with portions of the shoe 500 located at each side of the chain carrier 480.

The four endless chain carriers 480, together with the flights carried thereon, are driven synchronously with relation to one another and also in relation with the advance of the newly formed tubing and mandrel surface by means of a stationary internal gear 510 which is mounted from the machine frame co-axially with the mandrel and the rotatable pressure unit. The two endless chain carriers 474 and 476 are driven one from the other by means of two intermeshing gears 512, 514 mounted respectively on the cross shafts 484 and 488. The shaft 484 is in turn connected to a cross shaft 516 by meshing bevel gears 518. A small spur gear 520 on the shaft 516 meshes with the internal stationary gear 510. The endless chain carriers 478 and 480 are similarly driven through connections which include two intermeshing gears 524, 526 on shafts 496 and 490, the shaft 492 being also provided at its opposite end with a bevel gear connection 528 with a shaft 530 and spur gear 532 engaging with the stationary driving gear 510. It will readily be understood that rotation of the pressure unit 460 causes the spur gears 520, 532 to walk around the stationary gear 510 and causes the several endless chain carriers and their associated flights to be advanced simultaneously at the same rate and in timed relation to the rotation of the pressure unit and to the advance of the traveling mandrel surface.

Figs. 19 to 21 illustrate a further improvement in the mechanism for supporting and for driving the tapes and in the supporting and guiding means therefor. Each individual tape designated at 534 in Fig. 21 is supported at the rear end of its travel on a roller 536 which is mounted within the body of the mandrel designated at 537 and has the functions of a driving roller and of a tension or take-up roller. In this form of the invention each tape 534 is required to bend only in one direction. Particularly, where steel tapes are employed this construction has the very great advantage of substantially increasing the life of the tape.

In accordance with the invention and as best shown in Figs. 19 to 21 and 24 and 25 steel tapes 534 of novel and improved construction are employed which are particularly adapted for use under the severe operating conditions present. The tapes are made from Type 302 stainless half-hard steel. The tapes are fully hardened along narrow lines equally spaced from one another across the width of the tape. There are two principal reasons for this hardening.

It has been found that the half-hard steel tape tended to develop a pre-set so that the continuous bending and unbending shortened the life of the tape. By half-hard I mean a work hardened steel. The four lines of hardening rolled into the half-hard steel have the effect, first of making the tape completely resilient. There is no tendency whatever toward set, and at the same time whatever tendency there is for the tape to become fatigued, is greatly retarded. The second effect of the lines of hardening is to curve the tapes on a radius which is just sufficient to fit the circumference of the mandrel.

A problem encountered in the development of the tube forming machine using these tapes was to cause the tapes to track accurately along the length of the mandrel while being subjected to turning or lateral strains caused by the relative rotational movement of the mandrel and/or wrappers. This difficulty has been met by placing a central rib along the length of each tape on its inside surface which is caused to ride in slots 540 formed in the mandrel and in similar slots 542 formed in the guide rollers 536 and the rollers at the tip end of the mandrel over which the tape passes. The rib in its present form consists of a series of small balls 538 which are welded into small depressions, pre-punched, in the surface of the tape to provide a bond of maximum strength between the ball and the tape.

A further development of the rib has consisted in adding a coiled spring 543 which encloses the ball and which extends along the full length of the tape, and which is held in place by the adherence of the coil to the underside of each ball acting as a fastening means for the coil. This coil spring actually engages the sides and bottom of the slot in which the ridge runs. The diameter of the ball in the illustration shown is substantially equal to the outer diameter of the spring coils. With the arrangement described of the balls and coiled spring a continuous yieldable spring rib is provided between the tape and the slot. This reduces the direct wear on the balls and results in a substantial improvement in the holding quality.

It has also been found of great importance that the spring contains the ball in the event that the ball breaks loose so that the ball follows its accustomed track in the slot and cannot interfere with the operation of the tape, and further is prevented from being loose in the machine with the resultant damage to the machine bearings and other moving parts. In this combination it is noted that the balls are utilized primarily to support and center the spring and that the spring is employed as a resilient guide surface which prevents a minimum of impact against the ball. The coil spring has the further advantage in this combination in that it is completely flexible permitting the tape to be turned on a 1" radius at each end of its travel.

As shown in Figs. 19–21, each tape supporting roller 536 is supported to turn on a pin 544 mounted on a small carriage 546 slidable within an aperture formed in the surface of the mandrel mounted for sliding movement on a pair of trunnions 548 which engage in transverse slots in a cover member 550 set into the surface of the mandrel. At its rear end the carriage is connected by means of a projecting hinge member and a bracket 554 with a spring pressed plunger 556 which has the same construction and arrangement as the plunger 434 shown in Fig. 17, and acts to draw the carriage 546 rearwardly to maintain the tape 534 under the desired tensioning strain. The roller 536 is positively driven by means of connections which include a worm gear 558 supported to turn with the roller 536 and arranged for engagement with a worm 560 mounted on a small shaft 562 carried on bearings on the carriage 546. A spur gear 564 supported on the end of shaft 562 may be engaged with a cooperating gear provided on a drive shaft 568 (see Fig. 22) which is in turn driven by the engagement of a spur gear 570 thereon with a relatively stationary internal gear 572.

Figs. 22 and 23 illustrate a somewhat modified arrangement of the several elements of my apparatus for forming tubing from plastic material in which the newly formed tubing is carried along the full length of the travel of the traveling mandrel surface so that particularly the inner surface of the tubing is given an initial set by contact with the hot mandrel surfaces, and is then transferred from the traveling mandrel surface provided by tapes 534 to a tip portion 574 thereof having a relatively stationary tube supporting surface, whereupon heavy pressure is applied to the newly formed tubing during its continued passage along the stationary tip portion of the mandrel by means of the device for applying pressure to the tubing specifically illustrated in Figs. 14 to 16, inclusive. This form of my apparatus has the specific advantage that very heavy pressures may be applied against the partially cured tubing while supported by the stationary tip portion 574 in excess of the pressure which it is practicable to apply against the newly formed tubing supported on the traveling surface provided by the tapes 534.

A further modification of the apparatus which has been found preferable for certain applications consists in an arrangement of the several elements of the apparatus shown in Figs. 22 and 23 so that the device for applying pressure overlies the traveling mandrel surface provided by the endless tapes 534. In this arrangement of the apparatus the mechanism for positively advancing the tapes 534 is disconnected so that the tapes are free to move under the influence of the device for applying pressure which as previously set forth is driven in timed relation to the rotation of the mandrel. This arrangement of the apparatus has the specific advantage that a minimum of strain is brought to bear against the tapes which are thus insured a maximum length of life during continued operation of the apparatus.

The invention having been described what is claimed is:

1. In a tube forming machine, a mandrel having a tip portion thereof arranged to project substantially within the tube as it is formed and having an axially disposed return conduit therein, a plurality of endless conveyor elements having portions thereof extending longitudinally externally of the mandrel disposed with relation with one another to provide a tube forming surface and having the return portions of said endless conveyor elements disposed within said return conduit, a wrapper rotatable about the longitudinal axis of the mandrel and providing support for a strip of organic plastic material, actuating means connected with said endless conveyor elements for advancing said elements to move said tube forming surface toward the tip of the mandrel, and means rotating the wrapper to wrap said strip material about the conveyor tube supporting means at an overlapping lead angle.

2. In a tube forming machine, the combination with means for continuously producing tubing of organic plastic material, of a mandrel having a tip portion thereof arranged to project substantially within the tube as it is formed and having an axially disposed return conduit therein, a plurality of traveling endless conveyor elements having portions thereof extending longitudinally externally of the mandrel disposed with relation to one another to provide a tube support surface and having return portions disposed in said return conduit, and driving means connected with said conveyor elements for simultaneously driving said conveyor elements at the same linear rate.

3. In a tube forming machine, the combination of means for forming tubing, a mandrel having a tip portion thereof arranged to project within the tube and having an axially disposed return conduit therein, a plurality of traveling endless conveyor elements having portions thereof extending longitudinally externally of the mandel disposed with relation to one another to provide a tubular traveling support surface on which said tubing is formed and having return portions thereof disposed in said return conduit, supporting means on which said conveyor elements are freely movable longitudinally on said mandrel, and actuating means connected with each of said tapes for simultaneously driving said tapes at the same linear rate.

4. In a tube forming machine, the combination with means for continuously producing tubing of organic plastic material, of a mandrel having a tip portion thereof arranged to project substantially within the tube as it is formed and having an axially disposed return conduit therein, a plurality of endless tapes having portions thereof extending longitudinally externally of the mandrel disposed with relation to one another to provide a tube support surface and having return portions disposed in said return conduit, means guiding said tapes in parallel relation externally of the mandrel to provide a solidly formed tube support surface traveling toward the tip of the mandrel, and actuating means connected with each of said tapes for simultaneously driving said tapes at the same linear rate.

5. In a tube forming machine, the combination of a machine frame, means supported by the frame for continuously forming tubing, a hollow mandrel providing an internal return conduit and having a tip portion thereof arranged to project substantially within the tube as it is formed, supporting means on the frame on which the mandrel is mounted, a plurality of traveling endless conveyor elements having portions thereof supported upon and extending longitudinally externally of the mandrel to move freely thereon and disposed with relation to one another to provide a tubular traveling support surface on which the tube is formed, and having return portions thereof disposed within said return conduit, and means advancing the newly formed tube and tubular support surface therewith along the length of the mandrel including pressure applying devices externally engaging said newly formed tube around the entire periphery thereof, and moving with the newly formed tube toward the tip portion of the mandrel and means actuating said pressure applying devices to advance the work.

6. In a tube forming machine, the combination with means for producing tubing of organic plastic material, of a tube supporting mandrel having a tip portion thereof arranged to project within the tube, and means advancing the newly formed tube along the length of the mandrel including a group of endless carrier devices arranged about the mandrel and each having flights externally engaging the supported tube substantially around the circumference thereof and movable therewith along a substantial length of the mandrel, cam means engaging said flights against the tube under pressure, and means driving said endless carrier devices.

7. In a tube forming machine, the combination of a machine frame, means supported by the frame for continuously forming tubing, a hollow mandrel providing an internal return conduit and having a tip portion thereof arranged to project substantially within the tube as it is formed, supporting means on the frame on which the mandrel is mounted, a plurality of traveling endless conveyor elements having portions thereof supported upon and extending longitudinally externally of the mandrel to move freely thereon and disposed with relation to one another to provide a tubular traveling support surface on which the tube is formed, and having return portions thereof disposed within said return conduit, and means advancing the newly formed tube along the length of the mandrel including a group of endless carrier devices arranged about the mandrel and each having flights externally engaging the supported tube substantially around the circumference thereof, and movable therewith along a substantial length of the mandrel, and means driving said endless carrier devices.

8. A machine for continuously forming a product from organic plastic material having in combination a machine frame, means supported by the frame for continuously forming said product from organic plastic material, and means for applying a setting pressure to said product along a predetermined line of travel of said product as it is formed comprising a group of endless carrier devices arranged about a central axis and each having flights externally engaging said product in accordance with the predetermined cross-sectional shape thereof and movable therewith along a substantial distance along said line of travel, cam means engaging said flights against said product under pressure, and means driving said endless carrier devices.

9. A machine for continuously forming a product from organic plastic material having, in combination a machine frame, means supported by the frame for continuously forming said product from organic plastic material, and means for applying heat and pressure to set said product along a predetermined line of travel of said product as it is formed, comprising a group of endless carrier devices arranged about said line of travel and each having flights externally engaging said product and shaped to form said product in the desired shape, and movable with said product a substantial distance along said line of travel, means engaging said flights against said product under pressure, means driving said endless carrier devices, and means for subjecting said product to heat while engaged by said flights.

10. A machine for continuously forming a product from organic plastic material having in combination a machine frame, means supported by the frame for continuously forming said product from organic plastic material, means for applying pressure to said product along a predetermined line of travel of said product as it is formed, comprising two pairs of endless carrier devices, the devices of each pair being disposed along opposite sides of the line of travel of said product, and the two pairs of said devices being disposed at right angles to one another about said line of travel, each carrier device having flights externally engaging said product and shaped in accordance with a predetermined cross sectional shape thereof, power means on the machine for driving said endless carrier devices synchronously, and cam means associated with each carrier device for engaging the flights successively against said product under pressure along said line of travel of the product.

11. In a tube forming machine, the combination with means for producing tubing of organic plastic material, of a mandrel having a tip portion thereof arranged to project within the tube, means providing a conveyor tube supporting surface moving longitudinally on the mandrel, pressure applying devices externally engaging and moving the newly formed tube lengthwise of the mandrel toward the tip portion thereof, and means driving said conveyor tube supporting means and pressure applying devices at the same linear rate to advance the newly formed tube.

12. In a tube forming machine, the combination with means for continuously producing tubing of organic plastic material, of a mandrel having a tip portion thereof arranged to project substantially within the tube as it is formed and having an axially disposed return conduit therein, a plurality of traveling endless conveyor elements having portions thereof extending longitudinally externally of the mandrel disposed with relation to one another to provide a tube support surface and having return portions disposed in said return conduit, means simultaneously driving said conveyor elements at the same linear rate, pressure applying means externally engaging a tube carried on said traveling endless conveyor elements comprising endless carrier devices externally engaging the supported tube along a substantial length of the mandrel, and means driving said endless carrier devices at the same linear rate with the endless carrier elements.

13. In a tube forming machine, the combination with means for producing tubing of organic plastic material, of a mandrel having a tip portion thereof arranged to project within the tube and having an axially disposed return conduit therein, a plurality of traveling endless conveyor elements having portions thereof extending longitudinally externally of the mandrel disposed with relation to one another to provide a tube support surface and having return portions disposed in said return conduit, means simultaneously driving said conveyor elements at the same linear rate, pressure applying means externally engaging a tube carried on said traveling endless conveyor elements comprising a group of endless carrier devices arranged about the mandrel and each having flights externally engaging the supported tube substantially around the circumference thereof and movable therewith along a substantial length of the mandrel, cam means engaging said flights against the tube under pressure, and means driving said endless carrier devices at the same linear rate with the endless carrier elements.

14. In a machine for continuously producing fiber glass tubing the combination of a machine frame, a mandrel supported from the frame having a tip portion thereof arranged to project substantially within the tube as it is formed and having an axially disposed return conduit therein, a plurality of endless conveyor elements having portions thereof extending longitudinally externally of the mandrel disposed with relation to one another to provide a tube forming surface and having the return portions of said endless conveyor elements disposed within said return conduit, a wrapper rotatable about the longitudinal axis of the mandrel and providing support for strip thermosetting resin impregnated fiber glass material, means driving said endless conveyor elements at the same linear rate to advance the external portions thereof toward the tip of the mandrel and rotating the wrapper to wrap said strip material about the mandrel and conveyor elements at an over-lapping lead angle, and heating devices to initially set the newly formed tubing carried on the mandrel.

15. In a machine for continuously producing fiber glass tubing, the combination of a machine frame, a mandrel supported from the frame having a tip portion thereof arranged to project substantially within the tube as it is formed, means providing a conveyor tube supporting surface movable longitudinally on the mandrel, a wrapper rotatable about the longitudinal axis of the mandrel and providing support for supplying a strip thermosetting resin impregnated fiber glass material, means continuously advancing the conveyor tube supporting means, means rotating the wrapper to wrap said strip material about said conveyor tube supporting means and mandrel at an over-lapping lead angle, and means supplying heat and pressure against the wrapped material to set the newly formed tubing on the mandrel.

16. A machine for making tubing from plastic materials having in combination a fixed frame, a hollow mandrel providing an internal return conduit and having a tip portion thereof arranged to project substantially within the tube as it is formed, supporting means on the frame on which the mandrel is rotatably mounted, a plurality of endless tapes having portions thereof extending longitudinally externally of the mandrel disposed with relation to one another to provide a tubular support surface and having return portions disposed in said return conduit, means for continuously producing tubing of organic plastic material on said tube support surface, supporting means for the tapes on which the tapes turn as a unit with the mandrel, and an external feed device comprising a support rotatable with the mandrel on the mandrel axis, pressure applying devices carried on said support for externally engaging under pressure and moving in the direction of feed portions of said tubing supported by said tube support surface.

17. A machine for making tubing from plastic materials having in combination, a fixed frame, a hollow mandrel providing an internal return conduit and having a tip portion thereof arranged to project substantially within the tube as it is formed, supporting means on the frame on which the mandrel is rotatably mounted, a plurality of endless tapes having portions thereof extending longitudinally externally of the mandrel disposed with relation to one another to provide a tubular support surface and having return portions disposed in said conduit, means for continuously forming tubing of organic plastic material on said tubular support surface, supporting means for the tapes on which the tapes turn as a unit with the mandrel, and means for continuously advancing the tubular support surface formed by said tapes and the tubing formed on said support surface.

18. A machine for making tubing from plastic materials having in combination, a fixed frame, a hollow mandrel providing an internal return conduit and having a tip portion thereof arranged to project substantially within the tube as it is formed, supporting means on the frame on which the mandrel is rotatably mounted, a plurality of endless tapes having portions thereof extending longitudinally externally of the mandrel disposed with relation to one another to provide a traveling tubular support surface and having return portions disposed in said return conduit, means for forming tubing of organic plastic material on said tubular support surface, supporting means for the tapes on which the tapes turn as a unit with the mandrel, feeding devices for continuously advancing the tapes and tubing formed thereon comprising driving means connected to drive said tapes and pressure applying devices, and external tube engaging feeding means including a support rotatable with the mandrel axis, and pressure applying devices carried on said support externally engaging under pressure and advancing the newly formed tubing and tubular support surface toward the tip of the mandrel, and connections from said driving means moving said pressure applying devices in synchronism with the tapes.

19. A machine for making tubing from plastic materials having in combination, a fixed frame, a hollow mandrel providing an internal return conduit and supporting means on the frame on which the mandrel is rotatably mounted, a plurality of endless tapes having portions thereof extending longitudinally externally of the mandrel disposed with relation to one another to provide a tubular support surface and having return portions disposed in said return conduit, means for producing tubing of organic plastic material on said tube support surface, supporting means for the tapes on which the tapes are arranged to turn as a unit with the mandrel and are freely movable longitudinally, and feeding devices externally engaging portions of said newly formed tubing supported by the mandrel surface advancing therewith portions of the tape forming said surface.

20. In a machine for forming tubing from plastic material, a mandrel assembly on which said tubing is formed and set, which comprises a mandrel having a return passage therein, and a plurality of endless steel tapes supported upon and extending along said mandrel to form a tubular traveling mandrel surface and with return portions of said tapes passing through said return passage, said tapes being formed of endless strips of half-hard stainless steel having a plurality of lines of work hardening spaced across the width of said tapes and running longitudinally thereof.

21. In a machine for forming tubing from plastic material, a mandrel assembly on which said tubing is formed and set, which comprises a mandrel having a return passage therein, and a plurality of endless steel tapes extending along said mandrel and disposed to form a tubular traveling mandrel surface with the return portions of said tapes passing through said return passage, and supporting and guiding means on the mandrel on which the tapes are freely movable lengthwise of the mandrel including rolls around which the tapes pass at each end of their travel.

22. For use in a machine for forming tubing from plastic material having a mandrel and a traveling mandrel surface formed of endless conveyor tapes, a conveyor tape which comprises a freely flexible metallic strip, and a guiding rib comprising a coil spring disposed on one face of and extending along the length of the tape, and fastening means by which said coil spring is attached at intervals to the tape.

23. For use in a machine for forming tubing from plastic material having a mandrel and a traveling mandrel surface formed of endless conveyor tapes, a conveyor tape which comprises a freely flexible metallic strip, and a guiding rib comprising a series of balls secured to and spaced along one side of the tape, and a coil spring secured to said balls along the length of the tape.

24. For use in a machine for forming tubing from plastic material having a mandrel and a traveling mandrel surface formed of endless conveyor tapes, a conveyor tape which comprises an endless strip of half-hard stainless steel having a plurality of lines of work hardening spaced across the width of the tape and running longitudinally thereof to provide a freely flexible non-setting tape of long life.

25. For use in a machine for forming tubing from plastic material having a mandrel and a traveling mandrel surface formed of endless conveyor tapes, a conveyor tape which comprises an endless strip of half-hard stainless steel having a plurality of lines of work hardening spaced across the width of the tape and running longitudinally thereof to provide a freely flexible nonsetting tape of long life, said lines of hardening being applied against the same side of said tape thereby impressing a lateral curvature on the tape.

26. For use in a machine for forming tubing from plastic material having a mandrel and a traveling mandrel surface formed of endless conveyor tapes, a conveyor tape which comprises an endless strip of half-hard stainless steel having a plurality of lines of work hardening spaced across the width of the tape and running longitudinally thereof, and a guiding rib comprising a coil spring extending along one face of said tape, and fastening means securing said coil spring at intervals to said face of the tape.

27. In a machine for forming tubing from plastic material, the combination of a hollow mandrel providing an internal return conduit and having a tip portion arranged to project substantially within the tube as it is formed, a plurality of endless tapes having portions thereof supported upon and extending longitudinally externally of the mandrel to move freely thereon and disposed with relation to one another to provide a tubular traveling support surface on which the tube is formed and having return portions thereof disposed in said return conduit, each of said tapes being formed on the inner surface thereof with a guiding rib, and said mandrel being slotted to receive said ribs.

28. In a tube forming machine, the combination of a machine frame, means supported by the frame for continuously forming tubing, a hollow mandrel providing an internal return conduit and having a tip portion arranged to project substantially within the tube substantially as it is formed, supporting means on the frame on which the mandrel is carried, a plurality of endless tapes having portions thereof supported upon and extending longitudinally externally of the mandrel disposed with relation to one another to provide a tubular traveling support surface on which the tube is formed and having return portions thereof disposed in said return conduit, roller supports mounted from the mandrel around which said tapes are bound at each end of their travel along the length of the mandrel, each of said tapes being formed on the inner face thereof with a guiding rib, and said mandrel and support rollers being slotted to receive said ribs.

29. In a tube forming machine the combination of a machine frame, means supported by the frame for continuously forming tubing, a hollow mandrel providing an internal return conduit and having a tip portion with a fixed mandrel surface projecting substantially beyond the return conduit, supporting means on the frame on which the mandrel is mounted, a plurality of traveling endless conveyor elements having portions thereof supported upon and extending longitudinally externally of the mandrel to move freely thereon and disposed with relation to one another to provide a tubular traveling support surface on which the tube is formed and having return portions thereof disposed within said return conduit, means for driving said elements as a unit, pressure applying means externally engaging and forcing said tube against said tip portion of the mandrel, and means for applying heat to said newly formed tube including means for heating said endless conveyor elements in order to pre-set the internal surface of the newly formed tube.

References Cited in the file of this patent

UNITED STATES PATENTS

| | | |
|---|---|---|
| 2,331,969 | Friedrichs et al. | Oct. 19, 1943 |
| 2,398,876 | Bailey | Apr. 23, 1946 |